(12) United States Patent
Mukuno et al.

(10) Patent No.: US 6,494,931 B1
(45) Date of Patent: Dec. 17, 2002

(54) NICKEL POWDER AND CONDUCTIVE PASTE

(75) Inventors: Takashi Mukuno, Yamaguchi (JP); Takayuki Araki, Yamaguchi (JP); Yoshiharu Toshima, Yamaguchi (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/889,149

(22) PCT Filed: Nov. 10, 2000

(86) PCT No.: PCT/JP00/07936

§ 371 (c)(1),
(2), (4) Date: Oct. 17, 2001

(87) PCT Pub. No.: WO01/36131

PCT Pub. Date: May 25, 2001

(30) Foreign Application Priority Data

Nov. 12, 1999 (JP) ............................... 11-322899

(51) Int. Cl.$^7$ ................................................. B22F 1/00
(52) U.S. Cl. ......................................... 75/255; 252/513
(58) Field of Search .............................. 75/255; 252/513

(56) References Cited

U.S. PATENT DOCUMENTS

| 3,850,612 | A | * | 11/1974 | Montino et al. | |
| 5,584,908 | A | * | 12/1996 | Scheie | 75/374 |
| 6,120,576 | A | | 9/2000 | Toshima et al. | 75/370 |
| 6,316,100 | B1 | * | 11/2001 | Kodas et al. | 428/357 |

FOREIGN PATENT DOCUMENTS

| JP | A 8-246001 | 9/1996 |
| JP | A 11-152507 | 6/1999 |
| JP | A 11-189801 | 7/1999 |

OTHER PUBLICATIONS

Alymov, M.I. et al; Synthesis of nickel and iron ultrafine powders and mechanical properties of their compacts; Mater. Res. Soc. symp. Proc. (1995), 362 (Grain size and Mechanical Properties—Fundamentals and Applications), 143–7.*

Lymov, M.I. et al; Synthesis of nanoscale Ni and Fe powders and properties of their compacts; Nanostruct. Mater. (1995), 6(1–4), 393–5.*

Wada, Y. et al; Preparation of nano–sized nickel metal particles by microwave irradiation; Chemistry Letters (1999), (7) 607–608.*

* cited by examiner

*Primary Examiner*—Ngoclan Mai
(74) *Attorney, Agent, or Firm*—Young & Thompson

(57) ABSTRACT

The present invention relates to nickel powder characterized in that the rate of the nickel particles whose particle size is not less than 1.2 time the average particle size as determined by the observation with an SEM is not more than 5% of the total number of nickel particles, that the rate of nickel particles whose particle size is not more than 0.8 time the average particle size is not more than 5% of the total number of nickel particles and that the tap density of the nickel powder is not less than 2.5 g/cm$^3$, as well as a conductive paste for use in making a multilayer ceramic capacitor. The nickel powder of the present invention has a narrow particle size distribution and an excellent packing ability in a conductive paste and is particularly suitably used for forming a thin and uniform inner electrode for a multilayer ceramic capacitor, without being accompanied by the formation of any crack and/or the generation of any delamination.

4 Claims, No Drawings

NICKEL POWDER AND CONDUCTIVE PASTE

TECHNICAL FIELD

The present invention relates to nickel powder and a conductive paste for use in making a multilayer ceramic capacitor and more particularly to nickel powder, which has a narrow particle size distribution and an excellent packing ability in a conductive paste and which is, in particular, suitably used for forming a thin and uniform inner electrode for a multilayer ceramic capacitor without being accompanied by the formation of any crack and the generation of any delamination as well as a conductive paste for use in making a multilayer ceramic capacitor, which comprises the foregoing nickel powder.

BACKGROUND ART

A multilayer ceramic capacitor comprises a plurality of layers of a ceramic dielectric substance and a plurality of inner electrode layers, which are alternately multilayer and united and such a multilayer ceramic capacitor is in general produced by preparing a conductive paste by converting metal fine powder as an inner electrode material into a paste, printing a green sheet of a ceramic dielectric substance with the resulting conductive paste, laminating a plurality of the printed green sheets in such a manner that the ceramic dielectric green sheet and the conductive paste are arranged alternately, pressing the laminated printed green sheet with heating to thus unite them, and then firing the resulting assembly at a high temperature in a reducing atmosphere to thus unify the ceramic dielectric layers and the inner electrode layers.

As the inner electrode material, there has conventionally been used, for instance, a precious metal such as platinum, palladium or silver-palladium, but there have recently been developed techniques, which make use of base metals such as nickel in place of precious metals such as platinum, palladium and silver-palladium in order to save the production cost and these techniques have been advanced. However, if a nickel powder-containing paste is used for forming an inner electrode, problems such as the formation of cracks and/or the generation of delamination arise.

Moreover, electronic parts produced by using conductive pastes such as multilayer ceramic capacitors have recently been more and more miniaturized and the ceramic dielectric layer and the inner electrode layer have correspondingly been more and more thinner and the number of these layers multilayer has been increased. Accordingly, there have presently been produced a multilayer part such as a multilayer ceramic capacitor in which the thickness of the dielectric layer is not more than 2 μm, the thickness of the inner electrode layer is not more than 1.5 μm and the number of layers multilayer is not less than 100. To produce such a part, however, it is necessary to form a thin and uniform inner electrode without being accompanied by the formation of any crack and/or the generation of any delamination.

To obtain a thinner inner electrode layer, it may be satisfactory to use metal fine powder having a small average particle size balanced with the thickness of the inner electrode layer. However, coarse particles may be present in such metal fine powder even if the average particle size of the powder falls within the desired range. Accordingly, if an inner electrode layer is formed by using a conductive paste containing such metal fine powder, the coarse particles present therein may form projections on the resulting inner electrode layer, the projections may in turn break through the thin ceramic dielectric layer to thus form a short-circuit between the neighboring inner electrode layers. Accordingly, to prevent the formation of any short-circuit between inner electrode layers, it is necessary to use metal fine powder having an average particle size substantially smaller than that balanced with the thickness of such a thin inner electrode layer.

For instance, Japanese Un-Examined Patent Publication No. Hei 11-189801 discloses nickel ultra-fine powder whose average particle size ranges from 0.2 to 0.6 μm and in which the rate of coarse particles having a particle size of not less than 2.5 times the average particle size is not more than 0.1% based on the number of particles and further discloses in the fourth column, lines 21 to 24 that "If the particle size of coarse particles is limited to, for instance, about 1.5 μm, the average particle size of the ultra-fine nickel powder according to the present invention should accordingly be limited to 0.6 μm". Thus, it is necessary to use metal fine powder having a considerably small average particle size in order to produce a thin inner electrode layer.

In addition, to ensure stable conductivity of the resulting electrodes, such nickel fine powder should not only be finer, but also should have a high packing ability in a vehicle used in the production of a conductive paste. However, it may be more and more difficult to improve the packing ability of such fine particle-containing nickel powder in the conductive paste and the viscosity of the resulting conductive paste increases, as the particle size of the fine particles is reduced. In addition, a problem arises such that the heat shrinkage of the conductive paste layer and the oxidation of the nickel powder included therein are accelerated upon firing the printed green sheet.

It is thus an object of the present invention to provide nickel powder, which has a narrow particle size distribution, which has an excellent packing ability in a conductive paste and which can particularly suitably be used for forming a thin and uniform inner electrode for use in making a multilayer ceramic capacitor without being accompanied by the formation of any crack and/or the generation of any delamination, as well as a conductive paste, which is used for the manufacture of a multilayer ceramic capacitor.

DISCLOSURE OF THE INVENTION

The inventors of this invention have conducted various studies to accomplish the foregoing objects, have found that if the rates of coarse particles and fine particles present in nickel powder are reduced to relatively low levels and the tap density of the nickel powder is higher than a predetermined value, an inner electrode layer free of any projection can be formed without unnecessarily reducing the particle size of the nickel powder and the formation of any short circuit between the neighboring inner electrodes of the resulting ceramic capacitor can certainly be inhibited, that the oxidation of nickel particles and the heat shrinkage of the electrode layer can be inhibited because of the low content of fine particles and that the nickel powder has a high packing ability in a conductive paste due to a high tap density of the powder and also permits the formation of a beautiful sintered film and thus have completed the present invention.

Moreover, the inventors have also found that if the particle size of crystallites present in each nickel particle is small in addition to the foregoing characteristics, the sintering of nickel particles gently proceeds, the sintering speed is uniform and as a result, a thin and uniform inner electrode can be formed without being accompanied by the formation of any crack and/or the generation of any delamination.

Accordingly, the nickel powder of the present invention is characterized in that the rate of the nickel particles whose particle size is not less than 1.2 time the average particle size as determined by the observation with an SEM is not more than 5% of the total number of nickel particles, that the rate of nickel particles whose particle size is not more than 0.8 time the average particle size is not more than 5% of the total number of nickel particles and that the tap density of the nickel powder is not less than 2.5 g/cm$^3$.

The present invention also relates to a conductive paste for use in making a multilayer ceramic capacitor, which is characterized by comprising nickel powder having the foregoing characteristic properties.

BEST MODE FOR CARRYING OUT THE INVENTION

It is important in the nickel powder of the present invention that has a rate of the nickel particles whose particle size is not less than 1.2 time the average particle size as conveniently determined by the observation by an SEM with a magnification of ×10000 is not more than 5%, preferably not more than 4% and most preferably not more than 3% of the total number of nickel particles and that a rate of nickel particles whose particle size is not more than 0.8 time the average particle size is not more than 5%, preferably not more than 4% and most preferably not more than 3% of the total number of nickel particles. In other words, the rate of coarse particles present in the nickel powder is relatively low and thus the particle sizes of individual nickel particles present in the nickel powder are considerably uniform. Therefore, each inner electrode layer used in, for instance, a multilayer ceramic capacitor produced by using a conductive paste, which contains such nickel powder, may have a considerably thin thickness as compared with the average particle size of the nickel powder and may have a surface almost free of any projection. Accordingly, the resulting multilayer ceramic capacitor never causes any short circuit between the neighboring inner electrodes. In addition, the nickel powder of the present invention has a relatively low rate of fine particles and therefore, the paste containing such nickel powder never suffers from such problems that the paste has a high viscosity and that the heat shrinkage of the paste layer and the oxidation of the nickel particles included therein are accelerated during firing the printed green sheet.

It is also important in the nickel powder of the present invention that it has a tap density of not less than 2.5 g/cm$^3$, preferably not less than 2.7 g/cm$^3$ and more preferably not less than 3.0 g/cm$^3$. In other words, the nickel powder has a high packing ability in a conductive paste prepared by using the same because of its high tap density and beautiful sintered films can be obtained in, for instance, a multilayer ceramic capacitor prepared by using such a nickel powder-containing conductive paste.

Moreover, in the nickel powder according to the present invention, the average particle size of crystallites present in each nickel particle is preferably less than 400 Å and more preferably not more than 300 Å. Beautiful sintered films can be obtained in, for instance, a multilayer ceramic capacitor prepared by using a conductive paste containing such nickel powder. In addition, the particle size of crystallites present in each nickel particle is small and therefore, the sintering of nickel particles gently proceeds. More specifically, the sintering may proceed at a breath if the particle size of crystallites present in each nickel particle is large, while if the particle size of crystallites present in each nickel particle is small, the sintering is first taken place between crystallites within every particles, then particles gradually undergo sintering and therefore, the sintering speed is uniform. This accordingly results in the formation of beautiful films and the resulting product hardly undergoes any crack-formation and/or any delamination.

As has been discussed above, if the nickel powder according to the present invention is one in which the rate of the nickel particles whose particle size is not less than 1.2 time the average particle size as determined by the observation with an SEM is not more than 5% of the total number of nickel particles, the rate of nickel particles whose particle size is not more than 0.8 time the average particle size is not more than 5% of the total number of nickel particles, the tap density of the nickel powder is not less than 2.5 g/cm$^3$ and the average particle size of crystallites present in each nickel particle is less than 400 Å, a quite uniform, compact and thin inner electrode film can be formed without forming any crack and/or generating any delamination, while the formation of projections on the surface of the inner electrode layer is more completely inhibited, in a multilayer ceramic capacitor or the like prepared by using a conductive paste containing such nickel powder.

Regarding the nickel powder of the present invention, a multilayer ceramic capacitor is produced by using a conductive paste containing the foregoing nickel powder, the average particle size of the powder as determined by the observation by an SEM preferably ranges from 0.1 to 1 μm and more preferably 0.2 to 0.6 μm.

As has been described above, the nickel powder according to the present invention has a narrow particle size distribution and an excellent packing ability in a conductive paste and therefore, the conductive paste containing the nickel powder can be used in a variety of applications. In particular, when the nickel powder is used for forming the inner electrode of a multilayer ceramic capacitor, a quite uniform, compact and thin inner electrode film can be produced by using the nickel fine powder without unnecessarily reducing the particle size thereof, without causing any crack formation and/or generating any delamination, while the formation of projections on the surface of the inner electrode layer is more completely inhibited.

In addition, the conductive paste for use in making a multilayer ceramic capacitor according to the present invention is characterized by comprising the foregoing nickel powder according to the present invention and the conductive paste for use in making a multilayer ceramic capacitor of the present invention is particularly suitably used for forming a thin, uniform inner electrode, since the paste comprises the nickel powder having the foregoing excellent characteristic properties.

Then a preferred method for the production of the nickel powder of the present invention will be described below.

The nickel powder of the present invention can be produced by adding an aqueous nickel salt solution containing a nickel complex to an aqueous alkali metal hydroxide solution to thus prepare a nickel hydroxide-containing slurry, bringing the resulting slurry into contact with a hydrazine reducing agent under the temperature condition of not less than 55° C. to reduce the nickel hydroxide into nickel, subjecting the resulting nickel powder to a disaggregation treatment and then subjected to pneumatic classification to remove coarse particles and fine particles.

Such a nickel complex-containing aqueous nickel salt solution can be prepared by dissolving a nickel salt and a nickel complex-forming compound preferably a water-soluble compound carrying a carboxyl group and/or an amino group in water in any order; dissolving a water-soluble compound carrying a carboxyl group and/or an amino group in an aqueous nickel salt solution; or dissolving a nickel salt in an aqueous solution of a water-soluble compound carrying a carboxyl group and/or an amino group. In short, it is necessary in the present invention to prepare an aqueous solution containing a nickel salt and a water-soluble compound carrying a carboxyl group and/or an amino group. In this respect, however, it is preferred to prepare the nickel complex-containing aqueous nickel salt solution by dissolving a water-soluble compound carrying a carboxyl group and/or an amino group in an aqueous nickel salt solution. This is because, this method permits the easy formation of the desired nickel complex. Moreover, if using a nickel complex-containing aqueous nickel salt solution thus prepared, the resulting nickel particles have a uniform particle size and an improved packing ability in a conductive paste.

Specific examples of the foregoing water-soluble compound carrying a carboxyl group and/or an amino group include ethylenediaminetetraacetic acid, acetic acid, oxalic acid, malonic acid, salicylic acid, thioglycolic acid, glycine, ethylenediamine, alanine, citric acid, glutamic acid, lactic acid, malic acid, tartaric acid and triethanolamine.

When the nickel complex is formed in the aqueous nickel salt solution, the amount of the water-soluble compound carrying a carboxyl group and/or an amino group to be added to the aqueous solution ranges from 0.005 to 0.5 and more preferably 0.01 to 0.1 as expressed in terms of the molar ratio with respect to the nickel salt present in the aqueous nickel salt solution. The use of the water-soluble compound in such an amount permits the production of nickel powder having a narrower particle size distribution and simultaneously permits the achievement of well-balanced cost performance.

As nickel salts usable in the foregoing preferred production method, there can be listed, for instance, nickel sulfate, nickel nitrate and nickel halide such as nickel chloride; examples of alkali metal hydroxides include sodium hydroxide and potassium hydroxide; and examples of hydrazine reducing agents usable herein are hydrazine, hydrazine hydrate, hydrazine sulfate, hydrazine carbonate and hydrazine hydrochloride.

The concentration of the aqueous nickel salt solution used in the preparation of the foregoing nickel hydroxide-containing slurry preferably ranges from 10 to 150 g/L and more preferably 50 to 150 g/L as expressed in terms of the nickel ion concentration. The use of an aqueous nickel salt solution having such a concentration permits the achievement of such a narrow particle size distribution peculiar to the nickel powder of the present invention and simultaneously leads to the achievement of preferred results such as good production efficiency.

The concentration of the aqueous alkali metal hydroxide solution used in the preparation of the foregoing nickel hydroxide-containing slurry preferably ranges from 20 to 300 g/L and more preferably 60 to 250 g/L. In addition, the amount of the aqueous nickel salt solution relative to that of the aqueous alkali metal hydroxide solution is such that the amount of the alkali metal hydroxide present in the aqueous alkali metal hydroxide solution is preferably 1.1 to 2 eq. and more preferably 1.3 to 1.8 eq. per one eq. of the nickel salt present in the aqueous nickel salt solution. It is thus preferred to use these ingredients in such relative amounts to ensure the stable formation of nickel hydroxide and to simultaneously achieve well-balanced cost performance.

In the foregoing preferred production method, it is very important that the nickel hydroxide-containing slurry is brought into contact with a hydrazine reducing agent at a temperature of not less than 55° C. to thus reduce the nickel hydroxide into elemental nickel. If the reduction is carried out at a temperature of less than 55° C., it is difficult to obtain nickel powder having a uniform particle size and the resulting powder comprises a large amount of coarse nickel particles. Moreover, alkali metals as impurities are mixed in the resulting nickel powder in a high rate. Therefore, the reaction temperature during the reduction of the nickel hydroxide is set at a level of not less than 55° C. and preferably not less than 60° C. in the foregoing preferred production method.

Moreover, the nickel powder produced by bringing the foregoing nickel hydroxide into contact with an aqueous hydrazine solution maintained at a temperature of not less than 55° C., preferably not less than 60° C. to thus reduce the nickel hydroxide has a uniform particle size as determined by the observation with an SEM and the total content of impurities derived from the raw materials for the reaction in the resulting nickel powder is reduced to an extremely low level.

When preparing the nickel powder according to the present invention, it is important to subject the nickel powder obtained after the reducing reaction to a disaggregation or disintegration treatment. This is because the nickel powder per se obtained through a wet reaction is strongly agglomerate and therefore, the nickel powder suffers from the same disadvantages as those described in the foregoing section entitled "Background Art" observed when the powder contains coarse particles. In addition, the nickel powder also has a low tap density and therefore, the powder has an insufficient packing ability in a conductive paste. For this reason, the disadvantages such as those observed when such nickel powder is used in, for instance, a conductive paste cannot effectively be eliminated.

This disaggregation treatment is not restricted to any particular one, but may, for instance, be a high speed rotary impaction-pulverization treatment wherein nickel powder is pulverized by leading the powder to collide with a rotatable part rotating at a high speed; a media-stirring pulverization treatment in which nickel powder is stirred together with, for instance, beads to thus pulverize the same; and a high hydraulic disaggregation treatment and a jet impaction treatment in which two jets of nickel particle-containing slurry are led to collide with each other from different two directions at a high hydraulic pressure to thus pulverize the same.

Examples of devices for carrying out such disaggregation treatments are a high speed moving body-impaction type gas flow pulverizer, an impaction type pulverizer, a cage mill, a medium-stirring type mill, an axial flow mill, and a jet-impaction device. More specifically, there may be listed, for instance, Super Hybrid Mill (available from Ishikawajima-Harima Heavy Industries Co., Ltd.), Jet Mill (available from Ebara Corporation), Super Mass Colloider (available from Masuko Sangyo Co., Ltd.), Beads Mill (available from Irie Shokai Co., Ltd.), Altimizer (available from Sugino Machine Mfg. Co., Ltd.), NC Mill (available from Ishii Pulverizer Mfg. Co., Ltd.), Disintegrator (available from Otsuka Tekko Co., Ltd.), ACM Pulverizer (available from Hosokawa Micron Co., Ltd.), Turbo Mill (available from Matsubo Co., Ltd.), Super Micron (available from Hosokawa Micron Co., Ltd.), Micross (available from Nara Machine Mfg. Co., Ltd.), New Cosmomyzer (available from Nara Machine Mfg. Co., Ltd.), Fine Victor Mill (available from Hosokawa Micron Co., Ltd.), Ecoprex (available from Hosokawa Micron Co., Ltd.), CF Mill (available from Ube Industries, Ltd.), Hybridizer (available from Nara Machine Mfg. Co., Ltd.), Pin Mill (available from Alpinae Co., Ltd.), Pressure Homogenizer (available from Nippon Precision Machine Mfg. Co., Ltd.), Harrel Homogenizer (available from Kokusan Seiko Co., Ltd.), Mechano Fusion System (available from Hosokawa Micron Co., Ltd.) and Sand Mill (available from Yodo Casting Co., Ltd.).

Moreover, it is also important to subject the nickel powder to a pneumatic classification before and/or the disaggregation treatment to thus remove coarse particles and fine particles when preparing the nickel powder according to the present invention. This is because if the nickel powder is subjected to a pneumatic classification prior to the disaggregation treatment, highly agglomerate particles and huge particles can be removed in advance, while if the nickel powder is subjected to a pneumatic classification after the disaggregation treatment, fine particles may likewise be removed in addition to highly agglomerate particles and huge coarse particles, which have still remained in the nickel powder even after the disaggregation treatment. This treatment for removing the foregoing particles may be carried out at any appropriate stage depending on the quality of the nickel powder to be prepared and it is a matter of course that this classification treatment may be carried out both before and after the disaggregation treatment.

Regarding this treatment for removal, the use of, for instance, a sieve classifier is not suitable, while taking into consideration the prevention of any oxidation of the nickel powder surface and workability. For this reason, most preferred means is a pneumatic classifier and more specifically, preferably used are, for instance, an air separator as a centrifugal classifier, Spedick Classifier, Aquecut, Turbo Classifier.

Then a preferred method for the preparation of the conductive paste for use in making a multilayer ceramic capacitor will be described below.

The conductive paste of the present invention for use in making a multilayer ceramic capacitor is composed of, for instance, the aforementioned nickel powder of the present invention, a resin and a solvent. More specifically, resins usable herein are, for instance, cellulose derivatives such as ethyl cellulose, vinyl non-curing resins such as acrylic resins, polyvinyl butyral resins and polyvinyl alcohols, and thermosetting resins preferably used in combination with peroxides such as epoxy and acryl. In addition, solvents usable herein are, for instance, terpineol, tetralin, butyl carbitol and carbitol acetate, which may be used alone or in any combination. The paste may, if necessary, comprise glass frits. The conductive paste of the present invention used in the production of a multilayer ceramic capacitor may be prepared by mixing and stirring the foregoing ingredients by using a mixing device such as a ball mill or a three-roll mill.

The present invention will more specifically be described in more detail below with reference to the following Examples and Comparative Examples.

EXAMPLES 1

An aqueous solution prepared by dissolving 44.8 kg of nickel sulfate hexahydrate (grade: 22.2% by mass) and 1.8 kg of citric acid monohydrate in 80 L of pure water was slowly dropwise added to 100 L of a 200 g/L aqueous sodium hydroxide solution while maintaining the temperature of the solutions at 60° C. to thus separate out nickel hydroxide. Then to the resulting suspension, there was gradually added 30 kg of hydrazine monohydrate over 30 minutes, while maintaining the temperature of the solutions at 60° C., to thus reduce the nickel hydroxide into nickel, followed by washing the resulting nickel powder with pure water till the pH value of the wash liquid was reduced to a level of not more than 9, filtration, drying and then subjecting the resulting powder to a disaggregation treatment in Pulverizer AP-1SH Model (available from Hosokawa Micron Co., Ltd.) at a rotational speed of 2500 rpm to thus give nickel powder. Then coarse particles were removed from this disintegrated nickel powder by treating the nickel powder in an air separator: SF Sharp Cut Separator KSC-02 Model (available from Kurimoto, Ltd.) at a rotor rotational number of 6000 rpm and an air flow rate of 7.2 $m^3$/min to thus give desired nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.51 μm, the number of particles whose particle size was greater than 0.61 μm (0.51×1.2=0.612) was found to be 30 (corresponding to 2.0% of the total number of particles examined) and the number of particles whose particle size was less than 0.41 μm (0.51×0.8=0.408) was found to be 40 (corresponding to 2.7% of the total number of particles examined). In addition, the tap density of the nickel powder was found to be 3.23 g/$cm^3$ and the average particle size of the crystallites present in each particle was found to be 195 Å.

Moreover, to 100 parts by mass of the foregoing nickel powder, there was added a binder, which comprised 8 parts by mass of ethyl cellulose, 100 parts by mass of terpineol and 12 parts by mass of butyl carbitol, followed by mixing these ingredients and kneading them in a roll mill to give a conductive paste. The conductive paste thus prepared was printed on a polyimide (PI) film (UPILEX, available from Ube Industries, Ltd.) having a thickness of 125 μm through a Tetoron screen mask of 380-mesh size (printed pattern: 4 cm×4 cm). The printed PI film was subjected to a leveling treatment for 15 minutes at room temperature and then pre-drying in a thermostatic dryer with internal hot air circulation set at 60° C. for 30 minutes. Moreover, the printed PI film was transferred to a thermostatic dryer with internal hot air circulation set at 120° C. to thus subject the film to complete curing for 60 minutes. The PI film thus treated was removed from the dryer, followed by allowing to cool down to room temperature, and then determination of film density at randomly selected 20 points. As a result, the average film density was found to be 4.71 g/$cm^3$ and the standard deviation thereof was found to be 0.08 g/$cm^3$.

An attached body was produced by using the foregoing conductive paste in such a manner that the thickness of a dielectric layer was 2 μm, that of an inner electrode layer was 1.5 μm and the number of multilayer layers was 350. Pieces each having a size of 2.0 mm×1.25 mm were cut from the resulting attached body or the multilayer body, followed by drying and subjecting the pieces to a treatment for the removal of the binder. Thereafter, the pieces were fired at 1200° C. in a hydrogen-nitrogen mixed gas to give multilayer ceramic capacitors having a size of 2.0 mm×1.25 mm×1.25 mm. Then 200 samples were randomly taken from the resulting multilayer ceramic capacitors and were inspected for the formation of any crack and generation of any delamination. As a result, the number of rejects was found to be 2 and therefore, the percentage of rejects was found to be 1%.

The foregoing results of the various determinations, calculated values and the results of the observations are summarized in the following Table 1. In this connection, "Rate of $\geq 1.2$ d" appearing in Table 1 means the rate of the particles whose particle size is not less than 1.2 time the average particle size with respect to the total number of particles and "Rate of $\leq 0.8$ d" appearing in Table 1 means the rate of the particles whose particle size is not more than 0.8 time the average particle size with respect to the total number of particles.

EXAMPLE 2

An aqueous solution prepared by dissolving 44.8 kg of nickel sulfate hexahydrate (grade: 22.2% by mass) and 0.65 kg of glycine in 80 L of pure water was slowly dropwise added to 100 L of a 200 g/L aqueous sodium hydroxide solution while maintaining the temperature of the solutions at 60° C. to thus separate out nickel hydroxide. Then to the resulting suspension, there was gradually added 42 kg of hydrazine monohydrate over 20 minutes, while maintaining the temperature of the suspension at 60° C., to thus reduce the nickel hydroxide into nickel. The resulting nickel powder was washed with pure water till the pH value of the wash liquid was reduced to a level of not more than 9, followed by filtration and then drying. Thereafter, the resulting nickel powder was subjected to a disaggregation treatment in Hybridizer NHS-3 Model (available from Nara Machine Mfg. Co., Ltd.) at a rotational speed of 4000 rpm for 5 minutes. Then coarse particles were removed from this disintegrated nickel powder by treating the nickel powder in an air separator: SF Sharp Cut Separator KSC-02 Model (available from Kurimoto, Ltd.) at a rotor rotational number of 6000 rpm and an air flow rate of 7.2 m$^3$/min to thus give desired nickel powder.

The resulting nickel powder was inspected for various characteristic properties according to the same methods used in Example 1. A conductive paste was likewise prepared by the same method used in Example 1 and the film density as an inner electrode was also determined by the same method used in Example 1. Furthermore, a multilayer ceramic capacitor produced by the same method used in Example 1 was inspected for the formation of any crack and the generation of any delamination by the same method used in Example 1. The foregoing results of the various determinations, calculated values and the results of the observations are summarized in the following Table 1.

EXAMPLE 3

An aqueous solution prepared by dissolving 44.8 kg of nickel sulfate hexahydrate (grade: 22.2% by mass) and 1.8 kg of citric acid in 80 L of pure water was slowly dropwise added to 100 L of a 200 g/L aqueous sodium hydroxide solution while maintaining the temperature of the solutions at 70° C. to thus separate out nickel hydroxide. Then to the resulting suspension, there was gradually added 42 kg of hydrazine monohydrate over 30 minutes, while maintaining the temperature of the suspension at 70° C., to thus reduce the nickel hydroxide into nickel. The resulting nickel powder was washed with pure water till the pH value of the wash liquid was reduced to a level of not more than 9, followed by filtration and then drying. Then coarse particles were removed from this nickel powder by treating the nickel powder in a jet mill: Ebara Triade Jet PM100 Model (available from Ebara Corporation) at a rotor rotational number of 6000 rpm and an air flow rate of 7.2 m$^3$/min to thus give desired nickel powder.

The resulting nickel powder was inspected for various characteristic properties according to the same methods used in Example 1. A conductive paste was likewise prepared by the same method used in Example 1 and the film density as an inner electrode was also determined by the same method used in Example 1. Furthermore, a multilayer ceramic capacitor produced by the same method used in Example 1 was inspected for the formation of any crack and the generation of any delamination by the same method used in Example 1. The foregoing results of the various determinations, calculated values and the results of the observations are summarized in the following Table 1.

Comparative Example 1

An aqueous solution prepared by dissolving 44.8 kg of nickel sulfate hexahydrate (grade: 22.2% by mass) in 80 L of pure water was slowly dropwise added to 100 L of a 200 g/L aqueous sodium hydroxide solution while maintaining the temperature of the solutions at 50° C. to thus separate out nickel hydroxide. Then to the resulting suspension, there was gradually added 42 kg of hydrazine monohydrate over 20 minutes, while maintaining the temperature of the suspension at 50° C., to thus reduce the nickel hydroxide into nickel. The resulting nickel powder was washed with pure water till the pH value of the wash liquid was reduced to a level of not more than 9, followed by filtration and then drying. The resulting powder was then subjected to a disaggregation treatment in Pulverizer AP-1SH Model equipped with a knife-type hammer (available from Hosokawa Micron Co., Ltd.) at a rotational speed of 2500 rpm to thus give desired nickel powder.

The resulting nickel powder was inspected for various characteristic properties according to the same methods used in Example 1. A conductive paste was likewise prepared by the same method used in Example 1 and the film density as an inner electrode was also determined by the same method used in Example 1. Furthermore, a multilayer ceramic capacitor produced by the same method used in Example 1 was inspected for the formation of any crack and the generation of any delamination by the same method used in Example 1. The foregoing results of the various determinations, calculated values and the results of the observations are summarized in the following Table 1.

Comparative Example 2

An aqueous solution prepared by dissolving 44.8 kg of nickel sulfate hexahydrate (grade: 22.2% by mass) and 1.8 kg of citric acid monohydrate in 80 L of pure water was slowly dropwise added to 100 L of a 200 g/L aqueous sodium hydroxide solution while maintaining the temperature of the solutions at 60° C. to thus separate out nickel hydroxide. Then to the resulting suspension, there was gradually added 30 kg of hydrazine monohydrate over 30 minutes, while maintaining the temperature of the suspension at 60° C., to thus reduce the nickel hydroxide into nickel. The resulting nickel powder was washed with pure water till the pH value of the wash liquid was reduced to a level of not more than 9, followed by filtration and then drying. The resulting powder was then subjected to a disaggregation treatment in Pulverizer AP-1SH Model equipped with a knife-type hammer (available from Hosokawa Micron Co., Ltd.) at a rotational speed of 2500 rpm to thus give desired nickel powder.

The resulting nickel powder was inspected for various characteristic properties according to the same methods used in Example 1. A conductive paste was likewise prepared by the same method used in Example 1 and the film density as an inner electrode was also determined by the same method used in Example 1. Furthermore, a multilayer ceramic capacitor produced by the same method used in Example 1 was inspected for the formation of any crack and the generation of any delamination by the same method used in Example 1. The foregoing results of the various determinations, calculated values and the results of the observations are summarized in the following Table 1.

Comparative Example 3

Sufficiently dried anhydrous nickel chloride (22.0 kg) having a sulfur content of 500 ppm was allowed to stand in a quartz container and then evaporated with heating in a gas stream or argon gas as a carrier in a flow rate of 10 L/min while controlling the internal temperature of the container to 900° C. Then hydrogen gas as a reducing gas was passed through the vaporized nickel chloride gas in a flow rate of 3.5 L/min while controlling the reducing temperature to 1000° C. to thus obtain nickel powder. The resulting nickel powder was washed with pure water till the pH value of the wash liquid was reduced to a level of not more than 9, followed by filtration and then drying. The resulting powder was then subjected to a disaggregation treatment in Pulverizer AP-1SH Model equipped with a knife-type hammer (available from Hosokawa Micron Co., Ltd.) at a rotational speed of 2500 rpm. Then coarse particles were removed from this disintegrated nickel powder by treating the nickel powder in an air separator: SF Sharp Cut Separator KSC-02 Model (available from Kurimoto, Ltd.) at a rotor rotational number of 6000 rpm and an air flow rate of 7.2 m³/min to thus give desired nickel powder.

The resulting nickel powder was inspected for various characteristic properties according to the same methods used in Example 1. In this Comparative Example 3, the nickel powder was prepared by a dry method and therefore, it was found that the average particle size of the crystallites present in each nickel particle was found to be large. A conductive paste was likewise prepared by the same method used in Example 1 and the film density as an inner electrode was also determined by the same method used in Example 1. Furthermore, a multilayer ceramic capacitor produced by the same method used in Example 1 was inspected for the formation of any crack and the generation of any delamination by the same method used in Example 1. The foregoing results of the various determinations, calculated values and the results of the observations are summarized in the following Table 1.

TABLE 1

| | | Average Particle Size (d) | Rate of ≧1.2 d | Rate of ≦0.8 d | Tap Density | Average Particle Size of Crystallite | Average Film Density | Standard Deviation of Film Density | Number of Rejects | % of Rejects |
|---|---|---|---|---|---|---|---|---|---|---|
| Example | 1 | 0.51 μm | 2.0% | 2.7% | 3.23 g/cm³ | 195 Å | 4.71 g/cm³ | 0.08 g/cm³ | 2 | 1.0% |
| | 2 | 0.44 μm | 2.6% | 2.2% | 2.85 g/cm³ | 183 Å | 4.73 g/cm³ | 0.10 g/cm³ | 3 | 1.5% |
| | 3 | 0.47 μm | 1.8% | 2.6% | 3.45 g/cm³ | 238 Å | 4.68 g/cm³ | 0.11 g/cm³ | 2 | 1.0% |
| Comparative Example | 1 | 0.59 μm | 6.6% | 5.2% | 2.45 g/cm³ | 173 Å | 4.36 g/cm³ | 0.30 g/cm³ | 8 | 4.0% |
| | 2 | 0.58 μm | 3.5% | 2.9% | 2.31 g/cm³ | 189 Å | 4.40 g/cm³ | 0.28 g/cm³ | 6 | 3.0% |
| | 3 | 0.86 μm | 5.5% | 8.4% | 3.14 g/cm³ | 564 Å | 4.26 g/cm³ | 0.35 g/cm³ | 8 | 4.0% |

As will be clear from the data listed in Table 1, the nickel powder products prepared in Examples 1 to 3 according to the present invention have low contents of coarse particles having a particle size greater than a predetermined specific level and fine particles having a particle size smaller than a predetermined specific level, a narrow particle size distribution and a high tap density and therefore, they are also excellent in the packing ability in a conductive paste. Moreover, the film formed from such a nickel powder-containing conductive paste has a high film density and is uniform and the multilayer ceramic capacitor produced by using such a nickel powder-containing conductive paste accordingly has a low percentage of rejections.

Contrary to this, the nickel powder prepared in Comparative Example 1 includes large amounts of coarse particles and fine particles, the packing ability thereof in a conductive paste is correspondingly low and the multilayer ceramic capacitor produced by using such a nickel powder-containing conductive paste accordingly has a high percentage of rejections. In addition, the nickel powder of Comparative Example 2 has a low tap density and hence has a low packing ability in a conductive paste and the multilayer ceramic capacitor produced by using such a nickel powder-containing conductive paste accordingly has a high percentage of rejections. Further, the nickel powder of Comparative Example 3 has a high content of fine particles and the average particle size of crystallites present therein is large since the nickel powder is one produced according to a dry method. In addition, the film formed from such a nickel powder-containing conductive paste has a scattered film density and the multilayer ceramic capacitor produced by using such a nickel powder-containing conductive paste accordingly has a high percentage of rejections.

Industrial Applicability

The nickel powder of the present invention is particularly suitably used in a conductive paste for use in making a thin and uniform inner electrode for a multilayer ceramic capacitor without causing any crack formation and/or delamination.

What is claimed is:

1. Nickel powder characterized in that the rate of the nickel particles whose particle size is not less than 1.2 time the average particle size as determined by the observation with an SEM is not more than 5% of the total number of nickel particles, that the rate of nickel particles whose particle size is not more than 0.8 time the average particle size is not more than 5% of the total number of nickel particles and that the tap density of the nickel powder is not less than 2.5 g/cm$^3$.

2. The nickel powder as set forth in claim 1, wherein the average particle size of crystallites present in each nickel particle is less than 400 Å.

3. A conductive paste for use in making a multilayer ceramic capacitor characterized in that it comprises nickel powder as set forth in claim 1.

4. A conductive paste for use in making a multilayer ceramic capacitor characterized in that it comprises nickel powder as set forth in claim 2.

* * * * *